US010291673B2

(12) United States Patent
Zhuang et al.

(10) Patent No.: US 10,291,673 B2
(45) Date of Patent: May 14, 2019

(54) TRANSCODING METHOD AND SYSTEM, AND DISTRIBUTED FILE APPARATUS

(71) Applicant: TENCENT TECHNOLOGY (SHENZHEN) COMPANY LIMITED, Shenzhen (CN)

(72) Inventors: Qidong Zhuang, Shenzhen (CN); Chunxiao He, Shenzhen (CN); Yuanpeng Su, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 590 days.

(21) Appl. No.: 14/711,928

(22) Filed: May 14, 2015

(65) Prior Publication Data
US 2015/0244757 A1 Aug. 27, 2015

Related U.S. Application Data

(63) Continuation of application No. PCT/CN2013/085388, filed on Oct. 17, 2013.

(30) Foreign Application Priority Data

Nov. 27, 2012 (CN) .......................... 2012 1 0490708

(51) Int. Cl.
*H04L 29/06* (2006.01)
*H04N 21/222* (2011.01)
(Continued)

(52) U.S. Cl.
CPC ............ *H04L 65/60* (2013.01); *G06F 9/4881* (2013.01); *H04L 65/605* (2013.01); *H04L 67/02* (2013.01);
(Continued)

(58) Field of Classification Search
CPC .. G06F 11/1438; G06F 9/4881; G06F 9/4425; G06F 9/461; G06F 9/4843;
(Continued)

(56) References Cited

U.S. PATENT DOCUMENTS 6,182,061 B1 * 1/2001 Matsuzawa ....... G06F 17/30489
707/737
7,082,495 B2 * 7/2006 DeWhitt ............... G06F 1/3203
711/113
(Continued)

FOREIGN PATENT DOCUMENTS

CN 101197754 A 6/2008
CN 101909046 A 12/2010
(Continued)

OTHER PUBLICATIONS

First Office Action for Chinese Patent Application No. 201210490708. 0, dated Apr. 19, 2017.
(Continued)

*Primary Examiner* — Sm A Rahman
*Assistant Examiner* — Ranjan Pant
(74) *Attorney, Agent, or Firm* — Oblon, McClelland, Maier & Neustadt, L.L.P.

(57) ABSTRACT

A transcoding method used in a computer network comprises: receiving, by a task manager in the computer network, a transcoding task, where the transcoding task has task information; generating task dispatch information according to the task information; and separately acquiring, according to the task dispatch information, source data of media segments corresponding to a media file, parallelly transcoding the source data into data in a target format by using multiple transcoders, and storing the data into a storage server in the computer network, where the transcoder includes a processor of the storage server. Distributed (Continued)

transcoding is completed by using an idle CPU of a storage server, so that not only costs of hardware are reduced and an existing resource is fully used, but also transmission and copying of data are greatly accelerated, thereby improving transcoding efficiency.

20 Claims, 3 Drawing Sheets

(51) Int. Cl.
- *H04N 21/2343* (2011.01)
- *G06F 9/48* (2006.01)
- *H04L 29/08* (2006.01)

(52) U.S. Cl.
CPC .......... *H04L 69/06* (2013.01); *H04N 21/222* (2013.01); *H04N 21/234309* (2013.01)

(58) Field of Classification Search
CPC .... G06F 9/52; G06F 9/545; G06F 2209/5017; G06F 9/5038; G06F 9/5066; G06F 9/50; G06F 9/5027; G06F 9/5061; G06F 17/30038; G06F 9/5044; H04L 41/145; H04L 67/10; H04L 2209/20; H04L 63/1408; H04L 29/06027; H04L 65/1009; H04L 65/80; H04L 65/607; H04L 65/4092; H04L 67/1008; G06Q 10/0633
See application file for complete search history.

(56) References Cited

U.S. PATENT DOCUMENTS

| | | | | |
|---|---|---|---|---|
| 7,386,849 | B2* | 6/2008 | Dageville | G06F 9/5066 707/999.003 |
| 7,650,331 | B1* | 1/2010 | Dean | G06F 9/5066 712/203 |
| 8,850,223 | B1* | 9/2014 | Helsel | G06F 21/72 713/189 |
| 9,112,922 | B2* | 8/2015 | Benoit | H04L 67/2852 |
| 2003/0177240 | A1* | 9/2003 | Gulko | G06F 8/451 709/226 |
| 2004/0078369 | A1* | 4/2004 | Rothstein | G06F 9/5016 |
| 2005/0273772 | A1* | 12/2005 | Matsakis | G06F 8/41 717/136 |
| 2007/0055764 | A1* | 3/2007 | Dilley | H04L 29/06 709/223 |
| 2007/0179927 | A1* | 8/2007 | Vaidyanathan | G06K 9/00973 |
| 2007/0244962 | A1* | 10/2007 | Laadan | G06F 11/1438 709/201 |
| 2010/0241953 | A1 | 9/2010 | Kim et al. | |
| 2012/0159506 | A1* | 6/2012 | Barham | G06F 9/5044 718/104 |
| 2012/0198089 | A1* | 8/2012 | Dhruv | H04N 21/26233 709/231 |
| 2013/0103729 | A1* | 4/2013 | Cooney | G06F 17/30126 707/831 |
| 2013/0117418 | A1* | 5/2013 | Mutton | H04N 19/40 709/219 |
| 2013/0262394 | A1* | 10/2013 | Kumarasamy | G06F 17/30073 707/673 |
| 2014/0068196 | A1* | 3/2014 | Benoit | H04L 67/2852 711/135 |
| 2014/0119428 | A1* | 5/2014 | Catchpole | H04N 21/47217 375/240.02 |
| 2014/0139733 | A1* | 5/2014 | MacInnis | H04N 19/124 348/441 |
| 2014/0310758 | A1* | 10/2014 | Lee | H04N 21/2362 725/92 |

FOREIGN PATENT DOCUMENTS

| | | |
|---|---|---|
| CN | 102123279 A | 7/2011 |
| CN | 102497359 A | 6/2012 |
| CN | 102595652 A | 7/2012 |
| CN | 102780918 A | 11/2012 |
| WO | WO-2007117747 A2 | 10/2007 |

OTHER PUBLICATIONS

International Preliminary Report on Patentability and Written Opinion for Application No. PCT/CN2013/085388, dated Jun. 2, 2015.
Search Report in International Application No. PCT/CN2013/085388 dated Jan. 23, 2014.

* cited by examiner

TRANSCODING METHOD AND SYSTEM, AND DISTRIBUTED FILE APPARATUS

CROSS-REFERENCE TO RELATED APPLICATIONS

This is a continuation of International Patent Application No. PCT/CN2013/085388 filed Oct. 17, 2013, which claims the priority benefit of Chinese Patent Application No. CN 201210490708.0 filed Nov. 27, 2012, the entire respective disclosures of which are incorporated herein by reference.

FIELD OF THE TECHNOLOGY

The present disclosure relates to a transcoding method and system used in a computer network, and a distributed file apparatus.

BACKGROUND OF THE DISCLOSURE

Services such as a mailbox file transfer station, and offline download have a great number of media files in various forms, for example, videos. When a user needs to play a file by using a terminal such as a personal computer or a mobile phone online, the file can be viewed only by downloading the file previously, and transcoding the downloaded file into a file in a format that is supported by a mobile phone terminal or a player.

In order that a client can play a file directly online without needing to transcode the file, major video service companies purchase dedicated video transcoding servers and dedicated storage servers. A server side transfers data to a video transcoding server for transcoding, then transfers a transcoded video file to a storage server, and stores the transcoded video file, for a user to download. This offline transcoding manner enables the client to play the video file directly by using a terminal or a page, without needing to transcode the video file after the video file is downloaded.

However, in the foregoing manner, the video transcoding server generally uses serial transcoding, where transcoding of a film often needs dozens of minutes, and multiple times of file transmission (in which the server side first transmits the file to the video transcoding server, the video transcoding server then transmits the file to the storage server, and the storage server finally transmits the file to the client) during the transcoding also cost a long period of time.

In order to improve transcoding efficiency, some related technologies have already been provided in the industry. However, on the other side, a relationship between transcoding and storage is not considered in any of the designs in these related technologies, and specialized hardware is needed in all the designs to perform segmentation, transcoding, and merging operations, which increases costs of hardware, and also increases complexity of transcoding. In addition, a lot of existing distributed transcoding systems are based on a client/server (C/S) mode, and as long as the number of machines in the systems is slightly changed, distributed programs need to be recoded and redeployed, which has poor scalability. Transcoding and merging of CPU and I/O load on the machines are difficult to be controlled.

In summary, an existing network audio and video transcoding manner has problems such as large time consumption, low efficiency, high costs of hardware, and poor scalability.

SUMMARY

The present disclosure provides a transcoding method and system used in a computer network, and can reuse an idle computing resource. Some or all of the problems such as large time consumption, low efficiency, high costs of hardware, and poor scalability, which exist in an existing network audio and video transcoding manner can be solved according to embodiments of the present invention. The embodiments of the present invention can conveniently adjust a scale as needed, and are not only applicable to a computing cluster formed by a small quantity of computers, but also applicable to being used as a cloud transcoding method in a cloud environment formed by a large quantity of computers.

According to an embodiment of the present invention, a transcoding method used in a computer network is provided, including: receiving, by a task manager in the computer network, a transcoding task, the transcoding task having task information; generating task dispatch information according to the task information; and separately acquiring, according to the task dispatch information, source data of media segments corresponding to a media file, parallelly transcoding the source data into data in a target format by using multiple transcoders, and storing the data into a storage server in the computer network, the transcoder including a processor of the storage server.

According to another embodiment of the present invention, a transcoding system used in a computer network is provided, including: a task manager, configured to receive a transcoding task, the transcoding task having task information; a schedule manager, configured to generate task dispatch information according to the task information; and a storage server, the storage server being configured to store data in a target format, which is obtained after a media file is transcoded, and a processor of the storage server being used as multiple transcoders, and being configured to separately acquire, according to the task information and the task dispatch information, source data of media segments corresponding to the media file, and transcode the source data into the data in the target format.

According to still another embodiment of the present invention, a distributed file apparatus is provided, including: a storage server and multiple transcoders, the storage server including: a source data storage module, configured to store source data; and an uploaded data storage module, configured to store transcoded data; and the transcoders being configured to separately acquire, according to received task information and task dispatch information and from the source data storage module, source data of media segments corresponding to a media file, and transcode the source data into data in a target format, the transcoder including a processor of the storage server.

The foregoing technical solutions construct a transcoding task on an audio and video storage server having an idle computing resource, which fully uses an existing resource, and greatly reduces costs of hardware.

In addition, slicing does not need to be previously performed on a media file, and the slicing is completed while the transcoding task is executed. In this way, a degree of parallelism is improved, and transcoding time can be effectively reduced.

In addition, at a segmentation transcoding phase and a segmentation synthesis phase, accurate control of CPU usage and accurate control of a hard disk/memory are separately implemented, thereby avoiding affecting an original service of a current network machine.

In addition, for a particular service scenario, a real-time requirement that cannot be satisfied by a conventional MapReduce system can be easily satisfied by modifying a parameter.

In addition, a system has good scalability. By using a distributed file system and/or a network protocol, theoretically, an unlimited amount of video data can be processed, and it has already been proved that an existing system can process audio and video resources in a PB level.

In addition, the transcoding task is completed on a storage machine, so that data transmission/copying are mostly avoided, and the effect is close to local computation, thereby achieving an ideal goal of "migration of computation to storage" of the cloud computing.

In addition, accurate control of the transcoding task, accurate control of a segmentation task acquired by each transcoder, and accurate control of worker threads in the segmentation task of each transcoder can be implemented, and a current network service of the storage server can be effectively prevented from being affected.

Certainly, implementation of any product of the present disclosure does not necessarily need to achieve all the advantages described above at the same time.

The foregoing description is only an overview of the technical solutions of the present disclosure. For clearer understanding of the technical means of the present disclosure, the present disclosure may be implemented according to the content of the specification, and to make the foregoing and other objectives, features, and advantages of the present disclosure clearer and more comprehensible, detailed description is given below with reference to preferred embodiments and the accompanying drawings.

DESCRIPTION OF EMBODIMENTS

Figure 1:
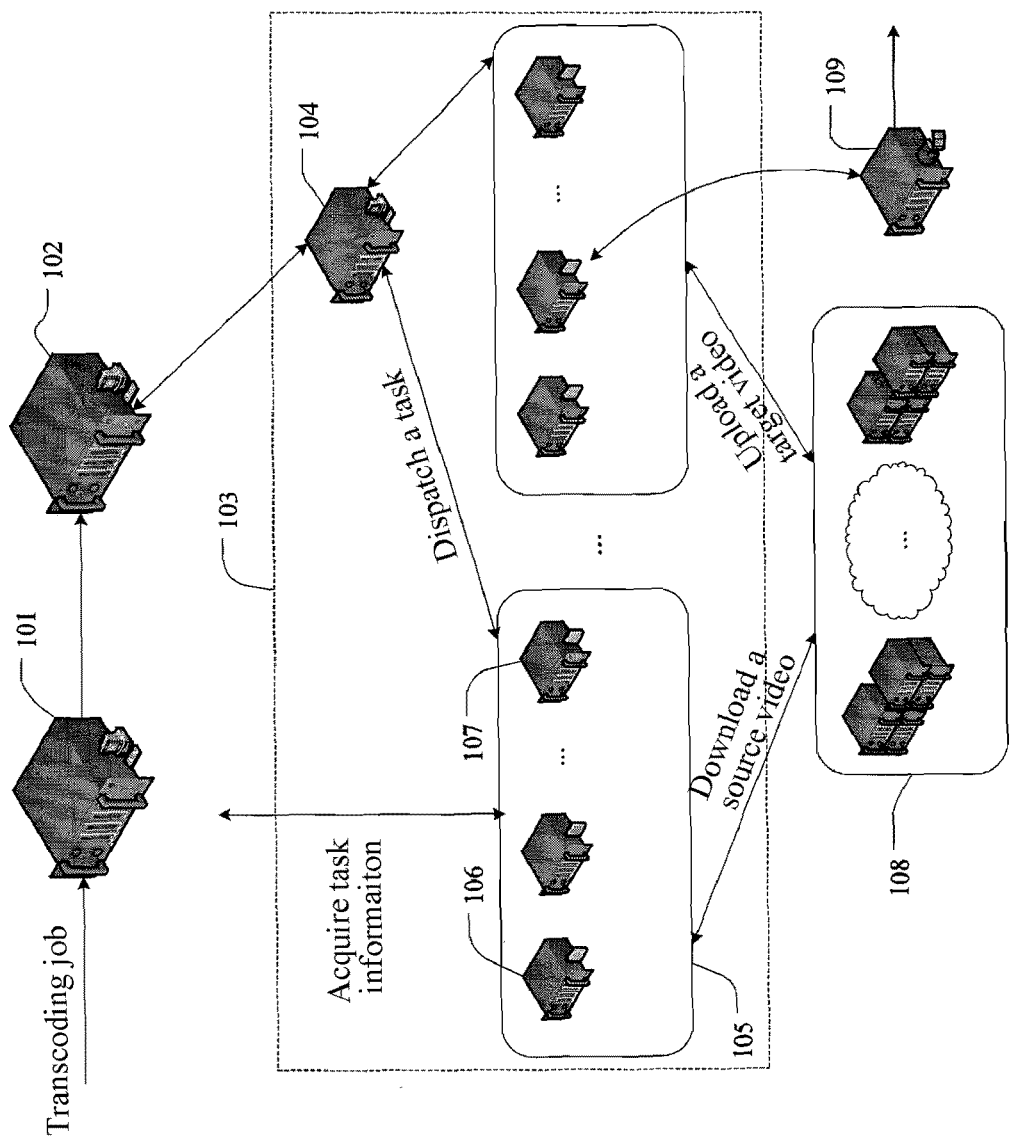
FIG. 1 is an architectural diagram of a cloud transcoding system that reuses an idle computing resource according to an embodiment of the present invention.

To further explain the technical means used in the present disclosure for achieving the intended objectives and the effects thereof, specific implementation manners, methods, steps, and effects of a transcoding method and system, and a distributed file apparatus that are provided in the present disclosure are described in detail below with reference to the accompanying drawings and preferred embodiments.

The foregoing and other technical content, features, and effects related to the present disclosure can be clearly rendered in the following detailed description of the preferred embodiments with reference to the accompanying drawings. By using the description of the specific implementation manners, the technical means used in the present disclosure for achieving the intended objectives and the effects thereof can be understood more deeply and specifically. However, the accompanying drawings are only used for providing reference and description, instead of limiting the present disclosure.

A cloud transcoding environment is used as an example for the following description. Cloud transcoding is media transcoding that is performed based on a cloud computing and cloud storage platform. Cloud computing is an Internet-based computing manner, and by using this manner, shared software and hardware resources and information may be provided for a computer and another device according to a requirement. Cloud storage is a storage part of the cloud computing, that is, a virtualized and scalable storage resource pool; a user uses the storage resource pool by means of the cloud computing, but not all storage parts of the cloud computing are separable. However, it should be noted that the embodiments of the present invention may conveniently adjust a scale as needed, and are not only applicable to a cloud environment formed by a large quantity of computers, but also applicable to a computing cluster formed by a small quantity of computers.

An I/O (hard disk/memory) intensive machine refers to that system CPU effectiveness is much better than hard disk/memory effectiveness, that is, a system operation is mostly in a situation that a CPU is waiting for read/write of I/O, and an occupancy rate of the CPU is low. A starting point of the main idea of the present disclosure gives consideration to a position where transcoded audio and video files are located—a storage server (which is generally formed by a cluster of a large quantity of storage machines). Because the storage server only plays a role of storing data, the storage server has a large quantity of storage machines whose CPUs are idle. These machines are I/O intensive machines, and therefore CPU utilization of the machines is generally lower than 20%. If these idle CPUs are used for transcoding, a lot of costs can be reduced, and transcoding can also be performed nearby a storage point of a file, thereby reducing time for remotely pulling and reducing bandwidth consumption. Not only costs of hardware can be reduced and an existing resource can be fully used, but also an ideal goal "migration of computation to storage" of the cloud computing can also be achieved.

In addition, a distributed file system involved in the present disclosure refers to that a physical storage resource managed by a file system is not necessarily directly connected to a local node, but is connected to a node by using a computer network. In view of internal implementation, unlike an ordinary file system, the distributed system is no longer responsible for managing a local magnetic disk, and file content and a directory structure of the distributed system are not stored in the local magnetic disk, but are transmitted to a remote system by using a network. Moreover, a same file is not only stored in one machine, but is stored in a cluster of machines in a distributed manner, where services are provided cooperatively, that is, a distributed type. Different from a standalone file system, in the distributed file system, these pieces of data are not put in one magnetic disk, and managed by an upper layer operating system. These pieces of data are stored in a server cluster, and servers in the cluster carry out responsibilities accordingly, and collaborate to provide services for the entire file system. Therefore, by means of distributed transcoding, time consumption of the transcoding can be reduced in an approximately linear manner, and user experience can be improved. Moreover, resource management and a scheduling solution of a distributed computing framework can effectively use a hardware resource, and reduce an influence of a failure. The distributed file subsystem and a corresponding management method described in the present disclosure preferably use a distributed system and a corresponding processing method that are disclosed in the Chinese patent NO. 200710307132.9 entitled "DISTRIBUTED SYSTEM, DISTRIBUTED SERVICE PROCESSING METHOD, AND RELATED APPARATUS".

Referring to FIG. 1, FIG. 1 is an architectural diagram of a cloud transcoding system that reuses an idle computing resource according to an embodiment of the present invention. The cloud transcoding system includes: a task manager 101, a task submission client 102, a schedule manager 104, and a distributed file subsystem. The system may further include a streaming media server 109. The task submission client 102 is connected to the task manager 101, and the task manager 101, the schedule manager 104, and the streaming media server 109 are all connected to the distributed file subsystem. The distributed file subsystem further includes: a storage server 108 (including: a source data storage module 110, and an uploaded data storage module 111) and multiple transcoders 106, and may include at least one synthesizer 107 as appropriate. As described below, although the storage server 108 and the transcoder 106 are shown in FIG. 1 as different components from a functional perspective, a processor of the storage server 108 is used as the transcoder 106 in an actual system.

After receiving a transcoding task (Transcoding Task), the task manager 101 first sends task information to the task submission client 102, and the task information is submitted by the task submission client 102. The task submission client 102 submits the task information to the schedule manager 104. The schedule manager 104 generates task dispatch information (task dispatch information) according to the received task information, and sends the task dispatch information to the transcoders 106 and the synthesizer 107.

The transcoders 106, the synthesizer 107, and the schedule manager 104 form a cloud computing framework 103. The cloud computing framework 103 is preferably implemented by using a MapReduce framework (for example, a Map/Reduce distributed processing framework disclosed in a U.S. Pat. No. 7,650,331 B1) and a variation thereof, or may also use an open-source Hadoop framework, a Sector/Sphere framework, a Typhoon framework, or the like. All the transcoders 106 and the synthesizer 107 are distributed on a computer cluster of the distributed file subsystem.

Figure 2:
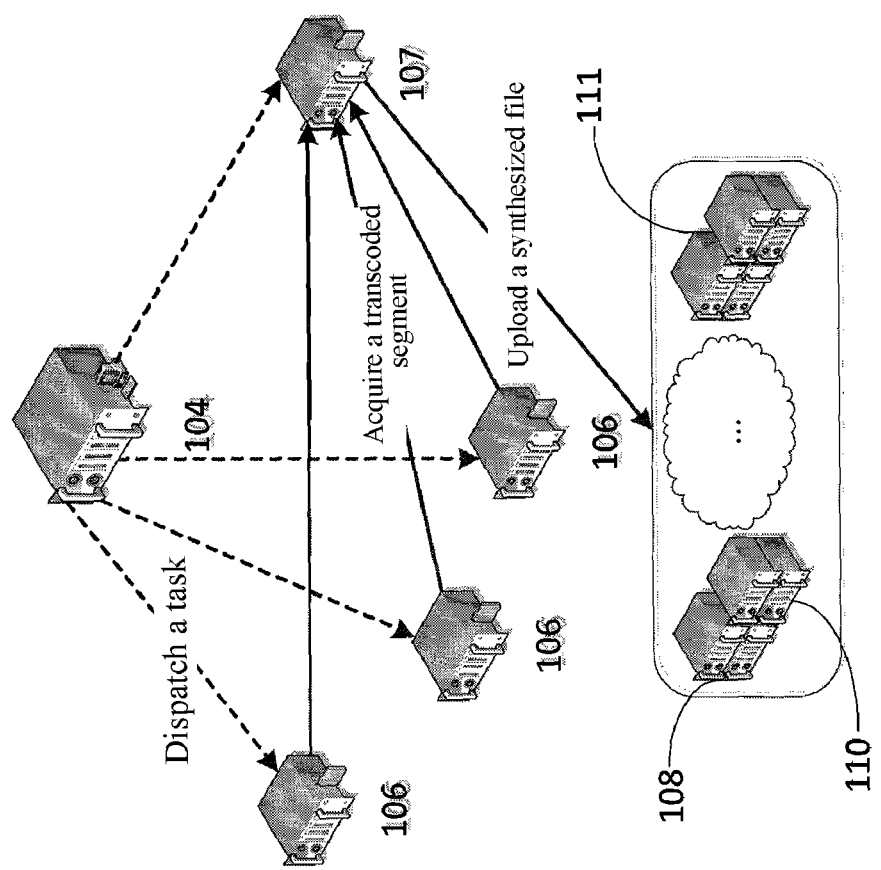
FIG. 2 is a schematic operation diagram of a process operation module according to an embodiment of the present invention.

With reference to FIG. 2, the schedule manager 104 is responsible for scheduling and managing tasks and resources of the cloud computing framework 103. The schedule manager 104 plays a role of determining, according to a to-be-transcoded source file in the received task information, the quantity of tasks (where the quantity of tasks is preferably divided by using a time length of the source file) that needs to be parallelly executed, forming the task dispatch information, and sending the task dispatch information to the transcoders 106 and the synthesizer 107. That is, the transcoder 106 and the synthesizer 107 learn their own tasks by using the received task dispatch information, so as to form a process operation module 105. One process operation module 105 includes the multiple transcoders 106 and the at least one synthesizer 107. For ease of description, only one synthesizer 107 is drew in the one process operation module 105 in FIG. 1 of this embodiment. One process operation module 105 generally includes only one synthesizer 107, but one process operation module 105 may also include multiple synthesizers 107 in a special case, for example, in a case in which task control is not accurate.

The transcoder 106 is responsible for transcoding media segments. After the operation module 105 is formed according to the task dispatch information, the transcoder 106 acquires the task information from the task manager 101. Table 1 is a schematic structural diagram of a piece of task information. The task information may include: a task type, a file position (for example, a universal resource locator (url) address in a source file), a starting position and time duration of audio or a video, and the like.

TABLE 1

| Field | Type | Remark |
|---|---|---|
| Taskid | Unsigned | Task id: to identify a transcoding task |
| Field id | String | File name (vid or sha) |
| url | url where a source file is located | http url |
| Start | Double | Start time of destination segmentation |
| Duration | Double | Duration of the destination segmentation |
| Type | Task type | Type of the transcoding task |
| Profile | int | Coding parameter setting of a destination file |

In the present disclosure, an abstract syntax notation (asn) protocol is preferably used for transference of transcoding task information. The asn protocol has advantages such as a rich and standard semantic expression, a unified coding rule, and the like. The asn protocol is preferably used for communication between the transcoder 106 and the task manager 101, and an asn protocol message corresponding to round-trip communication between the transcoder 106 and the task manager 101 is schematically shown as follows:

```
ReqDTranscodeSubmitTask::= SEQUENCE
{
    appid       INTEGER, --service type (video-hls:0, ftn-mail:1, ftn-xuanfeng:2)
    filename    OCTET STRING,
    filetype    OCTET STRING, --destination format (mp4|flv|hls)
    profile     INTEGER, --coding configuration
    rsptype     INTEGER, --whether to reply a result (if
submission succeeds, return to 0, and if transcoding is completed, return to
1);
    reserved    OCTET STRING
}
RspDTranscodeSubmitTask::= SEQUENCE
{
    retcode     INTEGER,
    retmsg      OCTET STRING,
    reserved    OCTET STRING
}
```

After acquiring the task information from the task manager 101, the transcoder 106 directly downloads segments of the source file from the source data storage module 110 according to a storage address of the source file in the task information, and the task dispatch information, transcodes the segments of the source file next, and then stores the transcoded segments into the uploaded data storage module 111. Therefore, according to this embodiment of the present invention, slicing does not need to be previously performed on a media file, and the slicing is completed while the transcoder 106 executes the task. A transcoding program can read the source file according to time shift. In this way, a degree of parallelism is improved, and transcoding time can be effectively reduced. Because a mepgts format has an attribute of being capable of freely merging, a target format of segment files may be unified in the mpegts format, which makes the processing easier during subsequent merging. It is proved by an experiment that a volume of a file that is obtained after a medium in such a format is segmented, transcoded, merged, and copied to a container such as an mp4 player is only greater than that of a file obtained after serial transcoding by about 0.01% to 1%. Time overheads for analyzing a group of pictures (GOP) sequence during merging is saved at little cost, and a phenomenon such as out of synchronization or jitter of audio or a video does not occur to the medium.

When the transcoder 106 downloads the segments of the source file from the source data storage module 110, for a multimedia file, for example, a multimedia file in an MP4 and a multimedia file in a TFLV format, which can obtain a particular and complete head, time points of all key frames (where an H.264 coding format is an IDR frame, and others are I frames) are obtained from the head, and then the multimedia file is divided according to several continuous GOPs whose duration can approximately form a time T (which is preferably taken as 30s during implementation), to obtain information that needs to be processed by the transcoders 106, where the information includes: a start time point and an end time point (or segment duration). For a file that cannot obtain the foregoing head, the file is divided strictly according to the segment duration T. In this way, the transcoder 106 may pull a media segment of a corresponding time period directly from the source data storage module 110, and costs for analyzing a video is almost negligible (because a head (head) of a video file is generally very small, relative to a size of a video).

The transcoding task of the transcoder 106 uses an idle CPU resource of a storage machine, and therefore, transcoding can be performed nearby (similar to data transmission between local area networks) a storage point of a source file, which greatly reduces time for remotely pulling the source file, and greatly reduces bandwidth consumption, relative to an existing technology. However, in order not to affect a normal operation of a storage service, utilization of a CPU resource may be accurately controlled, to control an occupancy rate of a CPU to be within a preset range. In the present disclosure, an occupancy rate of a CPU is preferably controlled by using a periodic interrupt program, which specifically includes that: a stop process signal (SIGSTOP) and a continue process signal (SIGCONT) are periodically and relatively granularly sent to a thread, which is running on each CPU core, of the transcoding program, so that the occupancy rate of a CPU of the program is controlled by controlling a proportion of time lengths of the two, and load balancing of multiple logical CPUs may also be implemented. In exemplary and specific implementation of this system, utilization of each logical CPU of the transcoding program is controlled to be 80%. In this way, it can be ensured that a normal operation of a storage index service process is not affected. In another embodiment, a limit of this utilization may be set to another suitable value. In addition, while CPU utilization is accurately controlled, the optimal quantity of transcoding threads of each different type of servers may be determined by an experiment, and the transcoding thread is bound to a particular logical CPU. In this way, the transcoding thread is prevented from drifting between different logical CPUs, and a cache, data, and an instruction pipeline are fully used, thereby improving performance to some extent.

After all the transcoders 106 in the process operation module 105 store, into the uploaded data storage module 111, file segments obtained after the transcoding is completed, the synthesizer 107 starts to execute a task. The synthesizer 107 merges, according to the task dispatch information sent by the schedule manager 104, data obtained after the transcoding by the transcoders 106 in the process operation module 105, to form a transcoded media file, and store the transcoded media file into the uploaded data storage module 111.

Specifically, after the transcoders 106 store, into the storage server 111, the file segments obtained after the transcoding is completed, the transcoders 106 send corresponding storage address information (a machine in which current audio or a current video is located, a path, or another piece of information) to a synthesizer 107 in the same process operation module 105, and the synthesizer 107 acquires the transcoded data from the uploaded data storage module 111 according to the received storage address information, for synthesizing, and re-uploads a complete media file to the uploaded data storage module 111 after the complete media file is encapsulated, for a user to download.

Particularly, one process operation module 105 may include more than one synthesizer 107, for example, tree-structured merging may be performed on a long video file in a merge sort manner.

The synthesizer 107 and the uploaded data storage module 111 both belong to the distributed file subsystem, and belong a same group of clusters, and therefore, data is downloaded and uploaded by the synthesizer 107 from the uploaded data storage module 111 both in a rapid speed (similar to data transmission between local area networks). A merging operation of the synthesizer 107 on media segmentation files is based on I/O of a computer hard disk/memory, and without a limit, a speed of the merging operation may achieve a maximum value of sequential access of a magnetic disk, thereby affecting the normal operation of the storage service. Therefore, in an embodiment, I/O control, especially read-write speed control, may be performed on the merging operation of the synthesizer 107, for example, the merging operation may be performed on a standalone module.

It should be noted that dozens of or even hundreds of transcoding tasks may be processed in one cloud computing framework 103 (that is a Map/Reduce cluster) at a same time. If detailed information of tasks that need to be processed by each transcoder 106 and a synthesizer 107 that are in each transcoding task is sent to the task submission client 102, then sent to the schedule manager 104 by the task submission client 102, and then sent, by the schedule manager 104, to a machine in which the each transcoder 106 and the synthesizer 107 are located, a volume of data to be transmitted may be very large, thereby affecting efficiency. In the present disclosure, a manner of sending common meta information is introduced in a breakthrough manner, that is, the schedule manager 104 dispatches the tasks of the transcoders 106 and the synthesizer 107, and "wakes up" and "instructs" each transcoder 106 to pull, from the task manager 101, information about a part of tasks that need to be transcoded by each transcoder 106, thereby greatly reducing the volume of data to be transmitted, and achieving concurrence at the same time. That is, this embodiment of the present invention further has a significant advantage, that is, several steps that are necessarily serial in a conventional system are all changed to be parallel.

On the other hand, due to different "views", the task manager 101, the transcoders 106, and the synthesizer 107 view different file paths. Another advantage of this manner of separating a "real task" (where the transcoders 106 acquire the task information from the task manager 101) from a "virtual task" (where the schedule manager 104 dispatches the task dispatch information to the transcoders 106 and the synthesizer 107) of the present disclosure is that a real path is prevented from being exposed, thereby improving security.

An http protocol may be used for uploading and downloading a file, that is, the http protocol may be used for communication between the transcoder 106 and the uploaded data storage module 111, communication between the transcoder 106 and the source data storage module 110, and communication between the synthesizer 107 and the uploaded data storage module 111. In an embodiment, the uploading and downloading of a file may be implemented by deploying, on the corresponding storage server, a server of a corresponding lightweight protocol.

The storage server 108 of this embodiment is shown as including the source data storage module 110 and the uploaded data storage module 111, which are divided according to a type of a stored file (not transcoded and transcoded) for ease of description. However, in an actual structure, both of the source data storage module 110 and the uploaded data storage module 111 are distributed on a cluster of a distributed file system, and generally, storage space of the two may be adjusted as needed, without needing to be clearly divided.

The streaming media server 109 is not a necessary component for the present disclosure, and the streaming media server 109 is configured to receive, in real time, the media segments obtained after the transcoding by the transcoders 106 is completed, and send the media segments to a client. In some occasions having a real-time requirement, after the preceding several transcoders 106 complete the transcoding tasks, a state message may be instantly sent to the streaming media server 109, to instruct the streaming media server 109 to download, from the preceding several transcoders 106, media segmentation obtained after the transcoding is completed, and send the media segmentation to a user in a streaming manner or a file manner. In this way, a requirement for "simultaneously viewing and downloading", and the like may be implemented, and wait time for a user is more lowered. The real-time requirement cannot be satisfied by a conventional MapReduce system. The present disclosure may implement such a requirement by deploying a system on the storage machine, and applying the foregoing mechanism. In such a case of "simultaneously viewing and downloading", the synthesizer 107 may not need to merge files, or a merged file does not need to be copied into a file in a particular encapsulation format, and in this case, the synthesizer 107 may do less work or may not work. Such a choice may be determined by a particular field (for example, a "type" field in Table 1) in the task information output by the task manager 101.

The present disclosure further provides a distributed file apparatus, and the distributed file apparatus includes the source data storage module, the uploaded data storage module, and the multiple transcoders, and may include the at least one synthesizer. A structure, a function, and a working principle of the distributed file apparatus are the same as those of the distributed file subsystem of the cloud transcoding system that reuses an idle computing resource.

Figure 3:
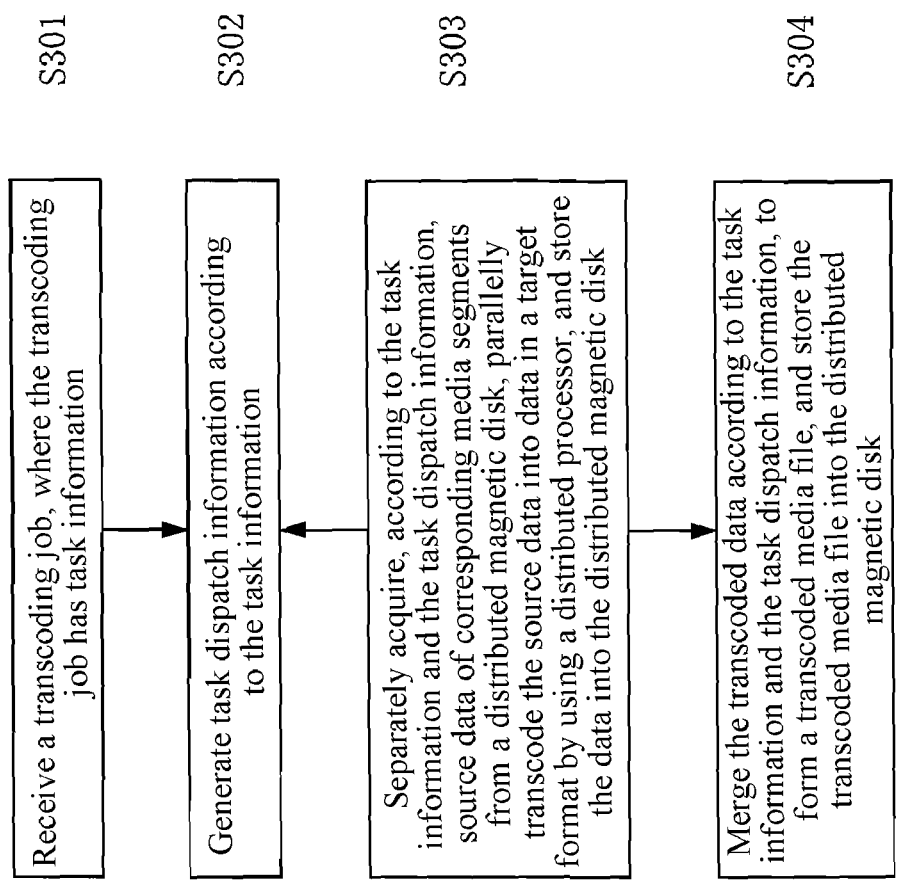
FIG. 3 is a flowchart of a cloud transcoding method that reuses an idle computing resource according to an embodiment of the present invention.

The present disclosure further provides a cloud transcoding method that reuses an idle computing resource. Referring to FIG. 3, the method includes steps S301-S303, and may further include step S304.

S301: Receive a transcoding task, where the transcoding task has task information.

The task information may include, for example, a type of a to-be-transcoded media file, a file position (for example, a url address of a source file), a starting position and time duration of audio or a video, and the like.

S302: Generate task dispatch information according to the task information.

An objective of generating the task dispatch information is to determine the quantity of tasks that need to be parallelly executed of the to-be-transcoded file; and in an embodiment, the quantity of tasks is divided by using a time length of the source file.

S303: Separately acquire, according to the task information and the task dispatch information, source data of corresponding media segments from a distributed magnetic disk, parallelly transcode the source data into data in a target format by using a distributed processor, and store the data into the distributed magnetic disk.

The distributed processor and the distributed magnetic disk described herein are a processor and a magnetic disk of a distributed file system, that is, the distributed processor and the distributed magnetic disk both belong to a same group of server clusters. Because a computer that stores a media file has a large quantity of idle CPUs, these parts of idle CPUs are used in the present disclosure for transcoding, so that not only a lot of costs are reduced, but also transcoding may be performed nearby a storage point of a file, thereby greatly improving transcoding efficiency.

In the present disclosure, an asn protocol is preferably used for transference of transcoding task information. The asn protocol has advantages such as a rich and standard semantic expression, a unified coding rule, and the like. Table 1 is a schematic structural diagram of a piece of task information. An http protocol is preferably used for uploading and downloading a file, and the uploading and downloading of a file may be implemented by deploying, on a corresponding storage server, a server of a corresponding lightweight protocol.

In addition, the transcoding task uses an idle CPU resource of a storage machine, and therefore, transcoding can be performed nearby (similar to data transmission between local area networks) a storage point of a source file, which greatly reduces time for remotely pulling the source file, and greatly reduces bandwidth consumption, relative to an existing technology. In order not to affect a normal operation of a storage service, utilization of a CPU resource may be accurately controlled, to control a occupancy rate of a CPU to be within a preset range. In an embodiment of the present invention, an occupancy rate of a CPU is controlled by using a periodic interrupt program, which specifically includes that: a SIGSTOP signal and a SIGCONT signal are periodically and relatively granularly sent to a thread, which is running on each CPU core, of the transcoding program, so that the occupancy rate of a CPU of the program is controlled by controlling a proportion of time lengths of the two, and load balancing of multiple logical CPUs may also be implemented. In specific implementation, utilization of each logical CPU of the transcoding program is controlled to be 80% or another suitable value. In this way, it can be ensured that a normal operation of a storage index service process is not affected. In addition, while CPU utilization is accurately controlled, the optimal quantity of transcoding threads of each different type of servers may be determined by an experiment, and the transcoding thread is bound to a particular logical CPU. In this way, the transcoding thread is prevented from drifting between different logical CPUs, and a cache, data, and an instruction pipeline are fully used, thereby improving performance to some extent.

In an optional step S304, the transcoded data is merged according to the task information and the task dispatch information, to form a transcoded media file, and store the transcoded media file into the distributed magnetic disk.

A process of merging the transcoded data may specifically be: first acquiring storage address information of the transcoded data in the distributed magnetic disk; next acquiring the corresponding transcoded data in the distributed magnetic disk according to the storage address information; and then merging the transcoded data.

During the process of the merging, the data is read from the distributed magnetic disk, and is further stored into the distributed magnetic disk after the merging. This series of actions are all completed by a CPU and a memory in a same group of clusters, and therefore, the file is uploaded and downloaded both in a rapid speed (similar to data transmission between local area networks). A merging operation on media segmentation files is based on I/O of a computer hard disk/memory, and without a limit, a speed of the merging operation may achieve a maximum value of sequential access of a magnetic disk, thereby affecting the normal operation of the storage service. Therefore, I/O control may be performed on the merging operation of the synthesizer 107, for example, the merging operation may be performed on a standalone module. An implementation manner of the I/O control is similar to the aforementioned control manner of the occupancy rate of a CPU.

In addition, in some occasions having a real-time requirement (for example, a user needs to view and download a file simultaneously), after transcoding of the source data of the media segments is completed, the media segments may be sent, according to a particular field (for example, a "type" field in Table 1) in the task information, to a client directly in a streaming manner or a file manner. In this way, a requirement for "simultaneously viewing and downloading", and the like may be implemented, and wait time for a user is more lowered. In such a case of "simultaneously viewing and downloading", files may not need to be merged, or a merged file does not need to be copied into a file in a particular encapsulation format, and in this case, the synthesizer 107 may do less work or may not work, thereby further reducing a burden of a CPU.

In the present disclosure, distributed transcoding is completed by using an idle CPU of a storage server, so that not only costs of hardware is reduced and an existing resource is fully used, but also transmission and copying of data are greatly accelerated, thereby improving transcoding efficiency.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A transcoding method used in a computer network, comprising:
   receiving, by a task manager in the computer network, a transcoding task of transcoding a media file stored in a distributed storage server, the transcoding task having task information;
   generating, according to the task information by a schedule manager in the computer network, task dispatch information of multiple sub tasks to be performed only by transcoders implemented by processors of the distributed storage server;
   acquiring, by the transcoders implemented by the processors of the distributed storage server, different media segments from the media file according to starting positions and time durations of the media segments;
   transcoding, by the transcoders implemented by the processors of the distributed storage server, the media segments into data in a target format in parallel;
   controlling an occupancy rate during the transcoding, wherein the controlling the occupancy rate includes periodically sending a stop process signal (SIGSTOP) and a continue process signal (SIGCONT); and
   storing the transcoded data into the distributed storage server.

2. The method according to claim 1, further comprising:
   merging the transcoded data according to the task information and the task dispatch information, to form a transcoded media file.

3. The method according to claim 2, wherein the step of merging the transcoded data comprises:
   acquiring storage address information, in the distributed storage server, of the transcoded data;
   acquiring the corresponding transcoded data in the distributed storage server according to the storage address information; and
   merging the acquired transcoded data.

4. The method according to claim 2, wherein the data is merged, a read-write speed of a hard disk/memory is controlled.

5. The method according to claim 4, wherein the step of merging the transcoded data is performed on a standalone computer that is different from a computer on which the transcoding is performed.

6. The method according to claim 1, wherein an http protocol is used for communication of uploading and downloading data in the distributed storage server.

7. The method according to claim 1, wherein the step of generating the task dispatch information according to the task information comprises:
   determining, according to a time length of the media file in the task information, a quantity of the sub tasks that need to be executed, and forming the task dispatch information.

8. The method according to claim 1, wherein an abstract syntax notation (ASN) protocol is used for transference of transcoding task information to the transcoders.

9. The method according to claim 1, further comprising:
   sending, in real time, the media segments obtained after the transcoding is completed to a client.

10. The method according to claim 1, wherein the controlling the occupancy rate comprises:
    during the transcoding, controlling the occupancy rate, taken by the transcoding, of at least one of the processors within a preset range.

11. The method according to claim 8, wherein the step of controlling the occupancy rate to be within the preset range comprises:
    periodically sending the stop process signal (SIGSTOP) and the continue process signal (SIGCONT) to a transcoding thread running on each core of the at least one of the processors, and
    controlling the occupancy rate to be within the preset range by controlling a time length between the SIGSTOP signal and the SIGCONT signal.

12. The method according to claim 1, wherein the media segments are directly read from the media file according to transcoding task information acquired by the transcoders from the task manager and the task dispatch information, without previously performing slicing on the media file.

13. The method according to claim 1, further comprising:
    acquiring, by the transcoders implemented by the processors of the distributed storage server, transcoding task information from the task manager in response to the task dispatch information, wherein the transcoding task information includes one or more of the following: a task type or a position of the media file.

14. A transcoding system used in a computer network, the transcoding system comprising:
a first computer configured to
receive, by a task manager, a transcoding task of transcoding a media file stored in a distributed storage server, the transcoding task having task information, and
generate, according to the task information by a schedule manager, task dispatch information of multiple sub tasks to be performed only by transcoders implemented by processors of the distributed storage server; and
the distributed storage server including a plurality of storage servers and configured to
acquire, by the transcoders implemented by the processors of the distributed storage server, different media segments from the media file according to starting positions and time durations of the media segments,
transcode, by the transcoders implemented by the processors of the distributed storage server, the media segments into data in a target format in parallel,
control an occupancy rate during the transcoding, wherein the distributed storage server is configured to periodically send a stop process signal (SIGSTOP) and a continue process signal (SIGCONT) to control the occupancy rate; and
store the transcoded data in the target format into the distributed storage server.

15. The transcoding system according to claim 14, wherein the transcoding system further comprises a second computer;

the second computer is configured to implement at least one synthesizer, the at least one synthesizer is configured to merge, according to the task dispatch information, data obtained after the transcoding by the transcoders to form a transcoded media file.

16. The transcoding system according to claim 15, wherein the transcoders store the transcoded data into the distributed storage server and send corresponding storage address information to the at least one synthesizer in a same process operation module, and the at least one synthesizer in the same process operation module acquires the corresponding transcoded data from the distributed storage server by using the storage address information, for synthesizing.

17. The transcoding system according to claim 15, wherein an http protocol is used for communication between the transcoders and the distributed storage server and communication between the at least one synthesizer and the distributed storage server.

18. The transcoding system according to claim 14, wherein the schedule manager determines, according to a time length of the media file in the task information, a quantity of the sub tasks that need to be executed, to form the task dispatch information.

19. The transcoding system according to claim 14, wherein an abstract syntax notation (ASN) protocol is used for communication between the transcoders and the task manager.

20. The transcoding system according to claim 14, further comprising:
a streaming media server, configured to receive, in real time, the media segments obtained after the transcoding by the transcoders is completed, and send the media segments to a client.

\* \* \* \* \*